United States Patent
Pola et al.

(10) Patent No.: US 12,513,248 B2
(45) Date of Patent: Dec. 30, 2025

(54) SYNCHRONIZATION OF EMERGENCY CALL LOCATION MANAGER SETTINGS FILE

(71) Applicant: State Farm Mutual Automobile Insurance Company, Bloomington, IL (US)

(72) Inventors: BhagyaRaj Pola, Normal, IL (US); Arun Raj Elan Kumaravel Pandiyan, Normal, IL (US); John Shaw, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 309 days.

(21) Appl. No.: 18/177,025

(22) Filed: Mar. 1, 2023

(65) Prior Publication Data
US 2024/0297939 A1    Sep. 5, 2024

(51) Int. Cl.
*H04M 11/04*    (2006.01)
(52) U.S. Cl.
CPC .................. *H04M 11/04* (2013.01)
(58) Field of Classification Search
CPC .... H04M 11/04; H04M 1/72418; H04W 4/90; H04W 76/50; G01S 2205/006
See application file for complete search history.

(56) References Cited

U.S. PATENT DOCUMENTS

| | | | |
|---|---|---|---|
| 6,963,908 B1 | 11/2005 | Lynch et al. | |
| 7,336,654 B2 * | 2/2008 | Barkley | H04M 1/2535 370/383 |
| 7,843,903 B2 | 11/2010 | Bakke et al. | |
| 8,064,875 B2 | 11/2011 | Velazquez et al. | |
| 8,289,953 B2 * | 10/2012 | Ray | H04L 61/5014 379/142.04 |
| 8,755,767 B2 * | 6/2014 | Maier | H04W 4/90 455/404.1 |
| 9,386,414 B1 * | 7/2016 | Mayor | G01S 19/17 |
| 9,806,941 B2 * | 10/2017 | Wouhaybi | G06F 9/4451 |
| 10,749,824 B1 * | 8/2020 | Robles | H04M 3/5116 |
| 10,820,181 B2 * | 10/2020 | Horelik | H04W 4/14 |
| 2002/0065828 A1 | 5/2002 | Goodspeed | |
| 2005/0003797 A1 * | 1/2005 | Baldwin | H04W 76/50 455/404.1 |

(Continued)

*Primary Examiner* — Akelaw Teshale
(74) *Attorney, Agent, or Firm* — Lee & Hayes, P.C.

(57) ABSTRACT

An emergency call location manager on a computer can use a settings file stored on the computer to determine a physical address that corresponds to a network address associated with the computer, such that the emergency call location manager can provide the physical address as dispatchable location information when a softphone application on the computer makes an emergency call. Task schedulers on computers can automatically execute tasks to download the settings file from a remote repository before the emergency call location manager begins executing on the computers, and to upload changes to the settings file made locally on the computers to the remote repository. Accordingly, the tasks can cause the emergency call location manager on a computer to use the most recent version of the settings file, even if the settings file was originally created on a different computer or a different computer made changes to the settings file.

20 Claims, 4 Drawing Sheets

(56) References Cited

U.S. PATENT DOCUMENTS

| | | |
|---|---|---|
| 2007/0201622 A1 | 8/2007 | Croak et al. |
| 2009/0097474 A1* | 4/2009 | Ray .................... H04M 3/5116 370/352 |
| 2011/0026687 A1* | 2/2011 | Smelyansky ........... H04L 12/66 370/352 |
| 2011/0151829 A1* | 6/2011 | Velusamy ............... H04W 4/90 455/404.2 |
| 2014/0229585 A1* | 8/2014 | Wouhaybi ............. G06F 9/4451 709/220 |
| 2016/0014583 A1* | 1/2016 | Thomaschima ........ H04W 4/90 455/404.2 |
| 2018/0054721 A1* | 2/2018 | Choe .................... H04M 3/5116 |
| 2018/0324300 A1* | 11/2018 | Banaudha ............... G08B 25/08 |
| 2022/0353368 A1* | 11/2022 | McAndrew ............. G01S 19/01 |
| 2023/0137028 A1* | 5/2023 | Anderson ......... H04M 3/42357 379/45 |
| 2023/0199461 A1* | 6/2023 | Allen .................... H04W 4/021 455/404.2 |
| 2023/0229471 A1* | 7/2023 | Ramanathan ....... G06F 9/45558 718/1 |

* cited by examiner

| Tasks 120 | Triggers 202 | Actions 204 |
|---|---|---|
| Repeating Upload Task 206 | Periodic or Scheduled Basis While User is Logged In to Computer | • If Settings File Has Changed, Upload Settings File To Settings File Repository |
| Lock Task 208 | Computer Locks | • Upload Settings File To Settings File Repository<br>• Terminate Emergency Call Location Manager |
| Login Task 210 | User Logs In to Computer | • Delay Initiation of Emergency Call Location Manager By X Time<br>• Download Settings File From Settings File Repository |
| Unlock Task 212 | User Unlocks Computer | • Delay Initiation of Emergency Call Location Manager By Y Time<br>• Download Settings File From Settings File Repository |

FIG. 2

SYNCHRONIZATION OF EMERGENCY CALL LOCATION MANAGER SETTINGS FILE

TECHNICAL FIELD

The present disclosure relates to emergency calls, and more particularly to emergency calls that are made via a softphone application executing on a computer.

BACKGROUND

Softphone applications can execute on computers, to allow users to make and receive telephone calls over the Internet and/or other networks via the computers in association with corresponding softphone numbers. When such softphone applications are used to make 9-1-1 calls or other emergency calls, the softphone applications and/or other corresponding software may determine and/or provide dispatchable location information in accordance with Federal Communications Commission (FCC) regulations, RAY BAUM's Act, and/or other laws or regulations.

Dispatchable location information associated with an emergency call can indicate a location of a calling party that is making the emergency call. For example, the dispatchable location information can indicate a street address of a location where the calling party is located. The dispatchable location information may also, in some examples, indicate a suite number, an apartment number, or other additional information that may help identify the location of the calling party. Accordingly, dispatchable location information associated with emergency calls can be used to route the emergency calls to Public Safety Answering Points (PSAPs) that are closest to the calling parties, and/or allow the PSAPs to dispatch police, fire, and/or other emergency services to the locations of the calling parties.

Softphone applications can execute on computers, such as laptops, that may be moved from location to location. Accordingly, it can be difficult for a softphone application executing on a computer to determine or track the current location of the computer. The softphone application may instead integrate with a separate emergency call location manager that also executes on the computer, and that is configured to determine the current location of the computer. If the softphone application on the computer makes an emergency call, the emergency call location manager on the computer can determine the current location of the computer, and can provide dispatchable location information that indicates the current location of the computer. As discussed above, the dispatchable location information can be used to route the emergency call to a corresponding PSAP, and/or the dispatchable location information can be provided to the PSAP.

In some examples, an emergency call location manager that executes on a computer may use a local settings file, associated with a softphone number registered with a softphone application on the computer, to store pairings of network addresses and physical addresses. For example, if the emergency call location manager determines that the computer is connected to a network in association with a particular network address, the emergency call location manager may add a corresponding physical address to the locally-stored settings file in association with the particular network address. Accordingly, if a softphone application on the computer makes an emergency call while the computer is associated with that particular network address, the emergency call location manager can retrieve the physical address that corresponds with the network address from the locally-stored settings file, and can provide the physical address as dispatchable location information for the emergency call.

However, reliance of an emergency call location manager on a local settings file that stores pairings of network addresses and physical addresses can cause issues when a user uses multiple computers. For example, a user may attempt to register a softphone number with an instance of a softphone application executing on a first computer, and the user may be prompted by an instance of the emergency call location manager to enter a location of the first computer that can be stored in a settings file on the first computer. The user may later attempt to register the same softphone number with another instance of the softphone application that is executing on a second computer. However, when the user attempts to register the softphone number with the softphone application on the second computer, an instance of the emergency call location manager on the second computer may display a registration error because the softphone number is already registered in association with the first computer and the second computer does not have a locally-stored settings file that is associated with the softphone number.

In some examples, if such a registration error occurs with the emergency call location manager, and a user makes an emergency call via the softphone application, the emergency call location manager may be unable to determine dispatchable location information for the emergency call, and the emergency call may be routed to an operator associated with the emergency call location manager. The operator may verbally ask the caller for their location, before then routing the call to a corresponding PSAP based on location information provided by the caller. Accordingly, involvement of an intermediate operator, in situations in which a registration error occurs with the emergency call location manager, can delay connection of the emergency call to the PSAP. Such delays in connecting emergency calls to PSAPs can be risky and/or dangerous, as callers may be making the emergency calls during time-sensitive situations.

The example systems and methods described herein may be directed toward mitigating or overcoming one or more of the deficiencies described above.

SUMMARY

Described herein are systems and methods associated with tasks that can be automatically executed via task schedulers on computers to upload and download a settings file, used by instances of an emergency call location manager on the computers, so that the emergency call location manager on each computer can use the most recent and up-to-date version of the settings file. The emergency call location manager can integrate with a softphone application on each of the computers, and be configured to use the settings file to determine a physical location of the computer that can be used as dispatchable location information for emergency calls made via the softphone application. For example, based on a network address associated with the computer when the softphone application makes an emergency call, the emergency call location manager can be configured to use settings file to look up a physical address that corresponds with the network address in the settings file, and to use the physical address as the dispatchable location information for the emergency call.

Registration errors and/or other issues with the emergency call location manager may occur if a settings file is not present on the computer, or is out of date, when the emergency call location manager begins executing on the computer. For example, the emergency call location manager may be configured to begin executing automatically as part of a start-up process when a user logs into a user account on the computer, for instance within one or two minutes, or another relatively short period of time, after the user has logged in. Registration errors and/or other issues may occur if the settings file is not already stored in memory on the computer when the user logs into the user account and the emergency call location manager begins to execute.

However, the tasks executed automatically by the task scheduler on the computer can cause the computer to download the most recent and up-to-date version of the settings file from a remote repository before the emergency call location manager begins executing on the computer. For example, a task executed automatically by the task scheduler in response to a user logging into a user account on the computer can delay execution of the emergency call location manager, which otherwise would have been initiated relatively quickly after the user logs into the user account. The task can also cause the computer to download a copy of the settings file from the remote repository during the delay in initiation of the emergency call location manager, such that the emergency call location manager has access to the most recent and up-to-date version of the settings file when the emergency call location manager begins executing on a delayed basis. As another example, the tasks executed automatically by the task scheduler on a computer can also cause the computer to upload changes to the settings file to the remote repository, such that the remote repository can store the most recent and up-to-date version of the settings file. Accordingly, the tasks can cause the emergency call location manager on each computer to use the most recent version most recent and up-to-date version of the settings file, even if the settings file was originally created on a different computer or a different computer made changes to the settings file.

According to a first aspect, a computer-implemented method includes delaying, by a processor of a computing device, and based on a task performed by a task scheduler on the computing device, execution of an emergency call location manager on the computing device for a period of time. The emergency call location manager is configured to determine, based on a settings file stored locally in memory of the computing device, dispatchable location information for emergency calls made via a softphone application executing on the computing device. The computer-implemented method additionally includes causing, by the processor, and based on the task, a download of the settings file from a remote settings file repository to the memory of the computing device during the period of time. The computer-implemented method further includes initiating, by the processor, and after the period of time based on the task, the execution of the emergency call location manager on the computing device.

According to a second aspect, a computing device includes one or more processors, and memory. The memory stores computer-executable instructions that, when executed by the one or more processors, cause the one or more processors to execute a task scheduler. The task scheduler is configured to automatically perform tasks on the computing device. A task performed by the task scheduler causes a delay of execution of an emergency call location manager on the computing device for a period of time. The emergency call location manager is configured to determine, based on a settings file stored locally in the memory, dispatchable location information for emergency calls made via a softphone application executing on the computing device. The task performed by the task scheduler additionally causes a download of the settings file from a remote settings file repository to the memory during the period of time. The task performed by the task scheduler further causes an initiation of the execution of the emergency call location manager, after the period of time, on the computing device.

According to a third aspect, one or more non-transitory computer-readable media store computer-executable instructions. The one or more non-transitory computer-readable media store computer-executable instructions, when executed by one or more processors of a computing device, cause the computing device to execute a task scheduler configured to automatically perform tasks based on corresponding trigger events that occur on the computing device. The computer-executable instructions also cause the computing device to delay, based on a task performed by the task scheduler in response to a trigger event, execution of an emergency call location manager on the computing device for a period of time. The emergency call location manager is configured to determine, based on a settings file stored locally in memory of the computing device, dispatchable location information for emergency calls made via a softphone application executing on the computing device. The computer-executable instructions additionally cause the computing device to cause, based on the task, a download of the settings file from a remote settings file repository to the memory of the computing device during the period of time. The computer-executable instructions further cause the computing device to initiate, after the period of time based on the task, the execution of the emergency call location manager on the computing device.

According to a fourth aspect, a computing device includes means for delaying execution of an emergency call location manager on the computing device for a period of time. The emergency call location manager is configured to determine, based on a settings file stored locally in memory of the computing device, dispatchable location information for emergency calls made via a softphone application executing on the computing device. The computing device additionally includes means for downloading the settings file from a remote settings file repository to the memory of the computing device during the period of time. The computing device further includes means for initiating, after the period of time, the execution of the emergency call location manager on the computing device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 shows an example of tasks that can be executed by a task scheduler on a computer, to upload and download a settings file used by an emergency call location manager on the computer.

DETAILED DESCRIPTION

Figure 1:
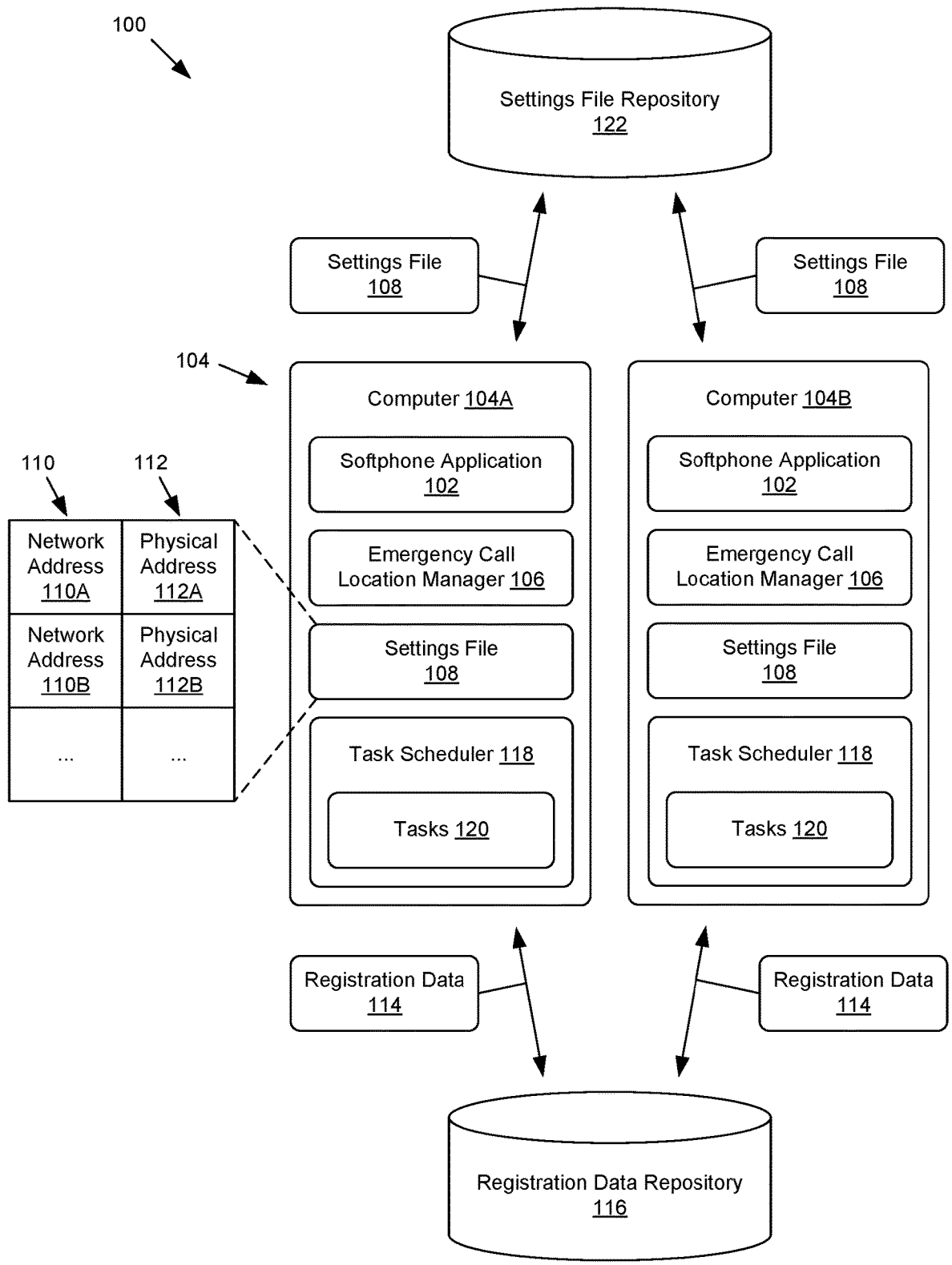
FIG. 1 shows an example in which a user may register a softphone number with instances of a softphone application executing on different computers.

FIG. 1 shows an example 100 in which a user may register a softphone number with instances of a softphone application 102 executing on different computers 104, such as computer 104A and computer 104B. The softphone number can be a telephone number, associated with the user, that can be used to make and/or receive telephone calls via the softphone application 102. The computers 104 can be workstations, desktop computers, laptop computers, tablet computers, and/or other types of computing devices. Each of the computers 104 can execute an instance of the softphone application 102 that is registered with the same softphone number associated with the user.

The instances of the softphone application 102 on the computers 104 can make and receive telephone calls, in association with the softphone number of the user, via the Internet and/or other networks. Accordingly, instead of using a cellular phone, a desk phone, or other dedicated telephone hardware, the user can use the softphone application 102 to make and receive telephone calls when a computer executing the softphone application 102 is connected to the Internet and/or other networks.

In some situations, the softphone application 102 may be used to make an emergency call, such as a 9-1-1 call. The emergency call can be routed to a Public Safety Answering Point (PSAP), which can answer the emergency call and can potentially dispatch police, fire, and/or other emergency services in response to the emergency call.

The instances of the softphone application 102 executing on each of the computers 104 can integrate with corresponding instances of an emergency call location manager 106 that also execute on the computers 104. The instances of the emergency call location manager 106 can be configured to determine location information, indicating locations of the computers 104, that can be used as dispatchable location information for emergency calls in accordance with FCC regulations, RAY BAUM's Act, and/or other laws or regulations.

As an example, if an instance of the softphone application 102 executing on computer 104A makes an emergency call, the instance of the emergency call location manager 106 executing on computer 104A can determine a current location of computer 104A. The current location of computer 104A, determined by the emergency call location manager 106, can be used by the emergency call location manager 106, the softphone application 102, and/or other elements to route the emergency call to a PSAP that serves the current location of computer 104A. The current location of computer 104A, determined by the emergency call location manager 106 may also, or alternately, be provided to the PSAP that answers the emergency call so that the PSAP can dispatch emergency services to the current location of computer 104A.

The instances of the emergency call location manager 106 executing on each of the computers 104 can determine locations of the corresponding computers 104 based on a settings file 108 that is stored locally in memory on each of the computers 104. The settings file 108 can be associated with the user and/or the softphone number of the user. For example, the settings file 108 can store information including the softphone number of the user. The settings file 108 can also store pairs of network addresses 110 and physical addresses 112. When the emergency call location manager 106 on one of the computers 104 determines location information for an emergency call being made via the softphone application 102 on that computer, the emergency call location manager 106 can use the settings file 108 stored locally on the computer to identify one of the physical addresses 112 that, in the settings file 108, corresponds with a current network address of the computer.

The network addresses 110 in the settings file 108 can be associated with networks to which the computers 104 can connect, such as networks that at least one of the computers 104 has previously connected to, networks of a business or other entity associated with the user, and/or other networks. The networks can be wired or wireless networks, such as Wi-Fi® networks, local networks, or other types of networks provided in residences, businesses, and/or other locations. The network addresses 110 can include Internet Protocol (IP) addresses, media access control (MAC) addresses, subnet addresses, and/or other types of network addresses. In some examples, the network addresses 110 can include network addresses, such as static IP addresses, that are assigned to the computers 104 when the computers 104 connect to corresponding networks. In other examples, the network addresses 110 can include IP addresses, MAC addresses, subnet addresses, and/or other network addresses associated with networks to which the computers 104 can connect, and/or of routers or other access points that the computers 104 can connect to in order to connect to such networks.

The physical addresses 112 can include street addresses, floor numbers, building numbers, suite, unit, or apartment numbers, and/or other information indicating physical locations that correspond to the associated network addresses 110. As an example, if network address 110A shown in FIG. 1 is associated with a Wi-Fi® network of a coffee shop, the corresponding physical address 112A can be a street address of the coffee shop. As another example, if network address 110B shown in FIG. 1 is associated with a subnet of a business network that is used on the fifth floor of a particular office building, the corresponding physical address 112B can include the street address of that particular office building as well as an identifier of the fifth floor.

When the softphone application 102 on a computer makes an emergency call, the emergency call location manager 106 on the computer can use the settings file 108 stored locally on the computer to determine the location of the computer, based on a network address associated with the computer when the emergency call is made. The location of the computer, determined by the emergency call location manager 106 based on the settings file 108, can be used as dispatchable location information for the emergency call. For example, if the computer has a network connection associated with network address 110A when the softphone application 102 on the computer makes an emergency call, and network address 110A corresponds to a Wi-Fi® network of a coffee shop as in an example discussed above, the emergency call location manager 106 can provide the physical address 112A indicating the street address of the coffee shop as dispatchable location information for the emergency call. However, if the computer instead has a network connection associated with network address 110B when the softphone application 102 on the computer makes an emergency call, and network address 110B corresponds to a subnet of a network used on the fifth floor of an office building as in another example discussed above, the emergency call location manager 106 can provide the physical address 112B indicating the street address and fifth floor of the office building as dispatchable location information for the emergency call.

The settings file 108 associated with the softphone number of the user can be stored locally in memory on each of the computers 104 as user data associated with the user, for instance within a directory, folder, or other file location associated with user data of the user. For example, if the computers 104 use the Windows® operating system, and if "<username>" represents a name of a Window® user account of the user, the settings file 108 associated with the softphone number of the user can be stored within a corresponding user data directory such as " . . . /users/<username>/AppData/Roaming/emergency-call-location-manager/settings." Accordingly, different users of the same computer can be associated with different softphone numbers and different settings files, and the different settings files associated with the different users and the different softphone numbers can be stored in different corresponding user data locations on the computer.

The emergency call location manager 106 on a computer can be configured to add a pairing of a network address and a physical address to the settings file 108 stored on that computer when the computer connects to a network in association with a network address that is not yet in the settings file 108. For example, if a user brings computer 104A to a new location and connects computer 104A to a new network at the new location, the emergency call location manager 106 can add an entry to the settings file 108 that includes a network address associated with the new network and a physical address associated with the new location.

When an instance of the emergency call location manager 106 on one of the computers 104 adds a new entry to the settings file 108, the emergency call location manager 106 may automatically detect a network address associated with a corresponding network connection, and can use that network address for the new entry in the settings file 108. The emergency call location manager 106 can also prompt a user to enter a corresponding physical address, or automatically determine the corresponding physical address, for the new entry.

In some examples, the emergency call location manager 106 may be configured to query a database (not shown), via the Internet or another network connection, to determine if the database already associates a detected network address with a physical location. As an example, a business may populate such a database with physical addresses and network addresses associated with office buildings of the business. Accordingly, if the user is associated with the business and takes one of the computers 104 to one of those office buildings for the first time, the emergency call location manager 106 on the computer may determine that the computer is associated with a new network address that is not yet within the locally-stored settings file 108 on the computer. However, the emergency call location manager 106 can automatically retrieve a corresponding physical address from the database based on the detected network address, and can add an entry to the settings file 108 that includes the detected network address and the corresponding physical address automatically retrieved from the database.

In other examples, for instance if a detected network address is not within a database, or if the emergency call location manager 106 is not configured to query such a database, an instance of the emergency call location manager 106 executing on a computer can prompt the user to enter a physical address of the location of the computer. For example, if the emergency call location manager 106 on computer 104A determines that computer 104A is associated with a new network address that is not yet within the locally-stored settings file 108 on the computer, the emergency call location manager 106 can display a user interface notification that prompts the user to provide user input indicating the street address of the current location of computer 104A. The emergency call location manager 106 can thus add a new entry to the settings file 108 on computer 104A that includes the new network address detected by the emergency call location manager 106, and that includes a user-entered street address of the current location of computer 104A.

A user may use different computers 104 at the same location, and/or at different locations. However, the emergency call location manager 106 may have been coded under an assumption that a user would only use a corresponding softphone number via the softphone application 102 on a single computer, which may natively prevent a user from using the same softphone number via the softphone application 102 on multiple computers. For instance, if different computers 104 have different versions of the settings file 108, and/or the settings file 108 is missing from any of the computers 104, when an instance of the emergency call location manager 106 begins executing on a computer, the emergency call location manager 106 may be natively configured to display registration errors and/or other errors.

As an example, if the user registers a softphone number with the softphone application 102 on computer 104A, the emergency call location manager 106 on computer 104A can create and store a settings file associated with the softphone number on computer 104A. The emergency call location manager 106 on computer 104A may also send registration data 114 via the Internet and/or other networks to a registration data repository 116, such as a database and/or server associated with the emergency call location manager 106, to indicate that the softphone number has been registered with a computer. If the same user later attempts to register the same softphone number with the softphone application 102 on computer 104B, the emergency call location manager 106 may determine that computer 104B does not have a locally-stored settings file associated with the softphone number when emergency call location manager 106 begins to execute. The emergency call location manager 106 may also determine, for instance by retrieving registration data 114 associated with the softphone number from the registration data repository 116, that the softphone number has already been registered and should be associated with a locally-stored settings file. Based on such an indication that the softphone number has been registered, and such a determination that computer 104B does not have a locally-stored settings file associated with the softphone number, the emergency call location manager 106 on computer 104B may be natively configured to display a registration error that prevents the user from using the softphone application 102 and/or the emergency call location manager 106 with the softphone number on computer 104B.

However, as shown in FIG. 1, a task scheduler 118 executing on each of the computers 104 can be configured to execute one or more tasks 120 configured to cause a most recent and up-to-date version of the settings file 108, associated with the softphone number of the user, to be stored locally on the computers 104 before the computers 104 begin executing the emergency call location manager 106, such that registration errors and/or other errors can be avoided. The computers 104 may be normally configured to begin executing instances of the softphone application 102 and the emergency call location manager 106 automatically as part of a start-up process after users log into user accounts on the computers 104. For example, a computer may be configured to normally launch the softphone application 102 and the emergency call location manager 106 within 30 seconds, one minute, two minutes, or any other relatively short period of time after a user logs into the computer. However, as described herein, one or more tasks 120 executed automatically by the task scheduler 118 can delay initiation of the emergency call location manager 106 on the computer until the computer downloads a most recent and up-to-date copy of the settings file 108, such that the emergency call location manager 106 has local access to that copy of the settings file 108 on the computer when the emergency call location manager 106 begins executing on the computer on a delayed basis.

Some tasks 120 can be associated upload trigger events that prompt the task scheduler 118 to perform those tasks 120, and can cause a corresponding computer to upload a changed and/or most up-to-date version of the settings file 108 from the computer to a settings file repository 122 via the Internet and/or other networks. Different computers 104 may upload different updated versions of the settings file 108 to the settings file repository 122 over time, based on changes made locally on the different computers 104 and/or other upload trigger events. The settings file repository 122 may be configured to keep the most recent and up-to-date version of the settings file 108 associated with the softphone number, for instance based on timestamps or other metadata.

Other tasks 120 can be associated with download trigger events that prompt the task scheduler 118 to perform those tasks 120, and that cause a corresponding computer to download the most recent and up-to-date version of the settings file 108 from the settings file repository 122 via the Internet and/or other networks. Such tasks 120 associated with download trigger events may also delay initiation of the emergency call location manager 106 on a computer until after the computer has downloaded the settings file 108 from the settings file repository 122. The tasks 120 can therefore cause the emergency call location manager 106 to begin initiating on a computer after the computer has downloaded and locally stored the most recent and up-to-date version of the settings file 108, such that errors that may otherwise occur with the emergency call location manager 106 due to a missing and/or outdated settings file on the computer can be avoided.

As an example, the tasks 120 can cause computer 104A to upload a copy of the settings file 108, associated with a softphone number of a user, to the settings file repository 122 when the settings file 108 is updated on computer 104A, when the user logs off computer 104A, when computer 104A is locked or shuts down, and/or when other upload trigger events occur on or in association with computer 104A. Accordingly, any changes made to the settings file 108 locally on computer 104A can be provided to the settings file repository 122, such that the settings file repository 122 can store the most recent and up-to-date version of the settings file 108 associated with the softphone number.

As another example, the tasks 120 can also cause computer 104B to download the most recent and up-to-date copy of the settings file 108 from the settings file repository 122 when computer 104B boots up, when the user logs into computer 104B, when the user unlocks computer 104B, and/or when other download trigger events occur on or in association with computer 104B. The tasks 120 associated with the download trigger events can also cause computer 104B to delay initiation of the emergency call location manager 106 on computer 104B for corresponding periods of time, to allow the most recent and up-to-date copy of the settings file 108 to be downloaded to computer 104B before a delayed initiation of the emergency call location manager 106 on computer 104B begins. Other examples of tasks 120, and corresponding trigger events and actions, are discussed further below with respect to FIG. 2.

The tasks 120 can be associated with scripts, computer-executable instructions, or other commands that the task scheduler 118 can execute at scheduled times and/or based on the occurrence of trigger events. For example, the tasks 120 can be executed via PowerShell® scripts in the Windows® operating system.

In some examples, the task scheduler 118 can be a component of an operating system of a computer that can be configured to automatically execute tasks 120 at scheduled times and/or based on the occurrence of trigger events. As an example, the task scheduler 118 can be a Windows® Task Scheduler provided with the Windows® operating system, which can execute tasks 120 via corresponding PowerShell® scripts. As another example, the task scheduler 118 can be a "cron" utility in Unix-based operating systems, or other type of job scheduler in an operating system, that can be configured to execute the tasks 120 as jobs at scheduled times and/or based on the occurrence of trigger events. In these examples, the task scheduler 118 can load with the operating system when the computers 104 boot, before the computers 104 begin executing the emergency call location manager 106. Accordingly, the task scheduler 118 can load with the operating system and begin processing tasks 120, for instance to determine if trigger events associated with individual tasks 120 have occurred and the tasks 120 are to be executed, before the computers 104 begin executing the emergency call location manager 106.

In other examples, the task scheduler 118 can execute as a standalone application that is separate from an operating system of a computer. In these examples, the task scheduler 118 be configured to load and execute on a computer before the emergency call location manager 106, for example by adjusting the order of start-up processes on the computer, such that the task scheduler 118 loads and can begin executing tasks 120 before the computer loads and executes the emergency call location manager 106.

The task scheduler 118 can be configured to execute the tasks 120 by the user associated with the softphone number to be used with the softphone application 102, or by an Information Technology (IT) department or other entity associated with the user. For example, if the user is associated with a business that provides the softphone number and/or the computers 104 to the user for use with the business, an IT department associated with the business may configure the task scheduler 118 on each of the computers 104 to execute the tasks 120. For example, the IT department may access the computers 104 directly or remotely, and can load configuration files, PowerShell® script files or other scripts, and/or other data to the computers 104 that configure the task scheduler 118 on the computers 104 to execute the tasks 120 at scheduled times and/or based on the occurrence of trigger events.

The task scheduler 118 can be configured to execute the tasks 120 in association with each user account on the computer, such that the tasks 120 can be executed in association with any of those user accounts when corresponding users use the computers 104. As discussed above, each user account on a computer may be associated with a different settings file 108, stored in corresponding user data. Similarly, an IT department or other entity may configure the task scheduler 118 with the tasks 120 in association with each of the user accounts, such the tasks 120 can be executed in association with any of the corresponding users who use the computer to upload and download corresponding settings files associated with softphone numbers of the users.

As discussed above, the tasks 120 may be associated with upload trigger events that cause a computer to upload the settings file 108 to the settings file repository 122, and/or download trigger events that cause the computer to download the settings file 108 from the settings file repository 122 and to delay initiation of the emergency call location manager 106 until after the settings file 108 has been downloaded from the settings file repository 122. The settings file repository 122 can be database, server, or other memory location that is accessible to the computers 104 over one or more networks.

The settings file repository 122 may be operated by an entity that configures the task scheduler 118 on the computers 104 to execute the tasks 120, and in some examples may not be associated with another entity that coded the emergency call location manager 106 or that operates the registration data repository 116. For example, although a provider of the emergency call location manager 106 may have configured the emergency call location manager 106 to communicate with the registration data repository 116 during registration processes and/or other processes, the emergency call location manager 106 may not be natively configured to interact with the settings file repository 122.

However, the tasks 120 that can be executed by the task scheduler 118 on the computers 104 can cause synchronization of the settings file 108 between the computers 104 by uploading the settings file 108 to the settings file repository 122 and downloading the settings file 108 from the settings file repository 122. Accordingly, the tasks 120 can cause any instance of the emergency call location manager 106, executing on any of the computers 104, to use the most recent version of the settings file 108 when the emergency call location manager 106 begins executing.

As a first example, a user may first register a softphone number with an instance of the softphone application 102 executing on computer 104A. Registration of the softphone number can prompt the emergency call location manager 106 on computer 104A to create the settings file 108 in local memory on computer 104A, and to provide registration data 114 indicated that the softphone number has been registered to the registration data repository 116. One or more tasks 120 executed by the task scheduler 118 on computer 104A can also cause the settings file 108 to be uploaded to the settings file repository 122.

If the user later switches from using computer 104A to using computer 104B, one or more tasks 120 executed by the task scheduler 118 on computer 104B can cause computer 104B to delay initiation of the emergency call location manager 106, and to download the settings file 108 from the settings file repository 122 to local memory of computer 104B. When computer 104B begins executing the emergency call location manager 106, for example after a delay caused by one or more of the tasks 120, the emergency call location manager 106 can operate based on the settings file 108 that is now stored in local memory on computer 104B.

For instance, if the user attempts to register the same softphone number with an instance of the softphone application 102 executing on computer 104B, the emergency call location manager 106 on computer 104B may be natively configured to communicate with the registration data repository 116 to determine if the softphone number has already been registered. Because registration data 114 in the registration data repository 116 indicates that the softphone number was previously registered, the emergency call location manager 106 on computer 104B may be natively configured to display a registration error if the settings file 108 associated with the softphone number is not present in local memory on computer 104B. However, such a registration error can be avoided because one or more tasks 120, executed via the task scheduler 118 on computer 104B, can cause the settings file 108 associated with the softphone number to be downloaded to local memory of computer 104B before the emergency call location manager 106 begins executing on computer 104B.

As a second example, an instance of the emergency call location manager 106 executing on computer 104B may make a change to the settings file 108 to add a new pairing of a detected network address and a user-entered physical address when computer 104B is connected to a new network at a new location. One or more tasks 120 executed by the task scheduler 118 on computer 104B can cause an updated version of the settings file 108, now including the new pairing of the network address and the physical address, to be uploaded to the settings file repository 122. If the user later switches from using computer 104B to using computer 104A, one or more tasks 120 executed by the task scheduler 118 on computer 104A can cause computer 104A to delay initiation of the emergency call location manager 106, and to download the updated version of the settings file 108 from the settings file repository 122 to local memory of computer 104A.

Accordingly, when computer 104A begins executing the emergency call location manager 106, for example after a delay caused by one or more of the tasks 120, the emergency call location manager 106 can operate based on the updated version of the settings file 108 that is now stored in local memory on computer 104A. As such, if the user uses computer 104A at the same new location associated with the new pairing that was added to the settings file 108 by computer 104B, the emergency call location manager 106 can use the updated version of the settings file 108 that is now stored on computer 104A to look up a detected network address associated with the new location and to determine the corresponding physical address of the new location, without prompting the user to again enter the physical address of the new location.

FIG. 2 shows an example 200 of tasks 120 that can be executed by the task scheduler 118 on a computer, to upload and download the settings file 108 used by the emergency call location manager 106 on the computer. The tasks 120 can be associated with corresponding triggers 202 and actions 204. The triggers 202 can be associated with events or schedules that prompt the task scheduler 118 on the computer to automatically perform the corresponding actions 204 associated with the tasks 120.

As a first example, the tasks 120 can include repeating upload task 206 that is performed automatically on a scheduled or periodic basis while the user is logged into a user account on the computer. For example, the repeating upload task 206 can be configured to be run automatically by the task scheduler 118 every five minutes on the computer, or based on any other interval or schedule. The repeating upload task 206 can have associated actions 204 that include determining whether the settings file 108 has changed since the last time the repeating upload task 206 was performed, and/or relative to a copy of the settings file 108 stored at the settings file repository 122. For example, the repeating upload task 206 can be configured to determine that the settings file 108 has changed if a timestamp indicating a time of the most recent edits to the locally-stored settings file 108 has changed since the last time the repeating upload task 206 was executed, or based on whether a timestamp of the locally-stored settings file 108 is more recent than a timestamp of a version of the settings file 108 stored in the settings file repository 122.

If the settings file 108 has changed, the actions 204 associated with the repeating upload task 206 can also include uploading the changed settings file 108 from the computer to the settings file repository 122. Accordingly, the task scheduler 118 can automatically perform the repeating upload task 206 periodically or on a scheduled basis to update a version of the settings file 108 stored in the settings file repository 122 based on any changes that have been made locally to the settings file 108 on the computer by the emergency call location manager 106.

As a second example, the tasks 120 can also include a lock task 208 that is triggered by the computer being locked. In some situations, the computer may become locked automatically after a period of inactivity, for instance if the lock task 208, another task, an operating system, or another element is configured to automatically lock the computer if no user input is received during a threshold period of time. In other examples, the computer may become locked in response to a user instruction to lock the computer, or based on another type of locking event or type of input. A user may remain logged into a user account when the computer is locked, and some applications may remain active on the computer, such that the user can later unlock the computer to resume use of the computer as discussed further below.

The lock task 208 can have associated actions 204 that include uploading the settings file 108 from the computer to the settings file repository 122. Accordingly, when the computer is locked, the current version of the settings file 108, in some cases including any updates made locally to the settings file 108 since the last time the repeating upload task 206 was performed, can be uploaded to the settings file repository 122. The actions associated with the lock task 208 can also include terminating the emergency call location manager 106. For example, although some applications may normally remain active on the computer when the computer is locked, the lock task 208 can cause the termination of the emergency call location manager 106 when the computer is locked. As discussed further below, by automatedly terminating the emergency call location manager 106 when the computer is locked, an unlock task 212 that is triggered when a user unlocks the computer again can delay re-initiation of the emergency call location manager 106 until the settings file 108 can be downloaded from the settings file repository 122.

In some examples, the lock task 208 or a similar task that has actions 204 of uploading the settings file to the settings file repository 122 and/or terminating the emergency call location manager 106 can be performed based on other triggers 202, such as a user logging out of a user account on a computer or the computer shutting down. Accordingly, when a user logs out of a user account on the computer, the user is automatically logged out of the user account based on a period of inactivity or another event, or the computer is manually or automatically shut down, the lock task 208 or a similar task can be executed by the task scheduler 118 to upload the settings file 108 to the settings file repository 122 and/or to terminate the emergency call location manager 106. In other examples, because operations to log out of a user account and/or shut down the computer may occur automatically after a period of inactivity during which the repeating upload task 206 would already have executed to upload a locally-changed version of the settings file 108, and because such a logout or shutdown operation may automatically include terminating the emergency call location manager 106 along with other applications, an automatic logout operation or computer shutdown operation may not trigger a task associated with the actions 204 of uploading the settings file 108 and terminating the emergency call location manager 106.

As a third example, the tasks 120 can also include a login task 210 that is triggered by a user logging into to the computer, for instance when the user enters a password or other credentials to log in to a user account and begin using the computer after the computer boots, or after the user or another user has logged out of the computer. The login task 210 can have associated actions 204 that include delaying initiation of the emergency call location manager 106 on the computer for at least a threshold period of time, and downloading the settings file 108 associated with the user and/or a softphone number of the user from the settings file repository 122. Accordingly, by delaying initiation of the emergency call location manager 106 on the computer for at least the threshold period of time, the settings file 108 can be downloaded from the settings file repository 122 and stored locally in memory on the computer, for instance in a user data directory, by the time the delayed initiation of the emergency call location manager 106 begins on the computer.

As a fourth example, the tasks 120 can also include an unlock task 212 that is triggered by a user unlocking a user account on the computer, for instance when the user enters a password or other credentials to unlock a user account on the computer after the user account was locked due to inactivity, in response to a user instruction, or for any other reason. The unlock task 212 can have associated actions 204 that include delaying initiation of the emergency call location manager 106 on the computer for at least a threshold period of time, and downloading the settings file 108 associated with the user and/or a softphone number of the user from the settings file repository 122. Accordingly, by delaying initiation of the emergency call location manager 106 on the computer for at least the threshold period of time, the settings file 108 can be downloaded from the settings file repository 122 and stored locally in memory on the computer, for instance in a user data directory, by the time the delayed initiation of the emergency call location manager 106 begins on the computer.

As discussed above, if a user was previously logged into the computer and the computer was then locked, the lock task 208 may have caused termination of the emergency call location manager 106. Accordingly, if the user later unlocks the computer, the unlock task 212 can delay re-initiation of the emergency call location manager 106 until after the settings file 108 has been downloaded from the settings file repository 122 and stored locally in memory on the computer. Accordingly, if any changes have been made to the settings file 108 between the time the computer was locked and the time the computer was unlocked, such as changes to the settings file 108 made via an instance of the emergency call location manager 106 on a different computer, the unlock task 212 can cause the most recent version of the settings file 108 to be downloaded to the unlocked computer before the emergency call location manager 106 begins executing on the unlocked computer.

In some examples, the login task 210 and the unlock task 212 can be associated with different threshold periods of time for delayed initiation of the emergency call location manager 106. The different threshold periods of time for delayed initiation of the emergency call location manager 106 may account for other actions performed by the computer, and/or resources available to the computer, during login operations relative to unlock operations.

For example, when a user logs into the computer, the computer may use memory, processing cycles, and other computing resources to initiate operating system elements and/or applications, set up network connections, and otherwise prepare the computer for use by the user. However, such operating system elements, applications, network connections, and/or other elements may remain active when the computer is locked. When the computer is unlocked from a locked state, the computer may return to a usable state more quickly and/or with the use of fewer computing resources than when a user logs into the computer initially. The computer may thus have more computing resources available to download the settings file 108, and/or be able to download the settings file 108 more quickly, when the computer is unlocked by a user and the unlock task 212 is triggered relative to when a user logs in to the computer and the login task 210 is triggered.

Accordingly, because the computer may be able to download the settings file 108 more quickly in association with an unlock operation than in association with a login operation, the login task 210 may delay initiation of the emergency call location manager 106 by a longer period of time than the unlock task 212 delays initiation of the emergency call location manager 106. As a non-limiting example, the unlock task 212 may delay initiation of the emergency call location manager 106 by thirty seconds, while the login task 210 may delay initiation of the emergency call location manager 106 by five minutes. In other examples, delay times, by which initiation of the emergency call location manager 106 is delayed via the login task 210 and/or the unlock task 212, can be other longer or shorter periods of time, and/or can be configurable by an IT department or other entity that configures the task scheduler 118 to execute the tasks 120.

In some examples, the login task 210, the unlock task 212, or another similar task may be trigged on a computer when the computer attempts to establish a Virtual Private Network (VPN) tunnel to one or more specified network destinations, for instance to access a remote computer. In these examples, the login task 210, the unlock task 212, or another similar task can cause the computer to download the settings file 108 before the emergency call location manager 106 begins executing on the computer and the softphone application can make emergency calls via the VPN tunnel in association with the emergency call location manager 106. In these examples, the VPN tunnel may be associated with a VPN network address that is not associated with the physical location of the computer that is accessing the VPN tunnel, and the emergency call location manager 106 may accordingly be configured to prompt the user to enter the physical address of the current location of the computer.

Figure 3:
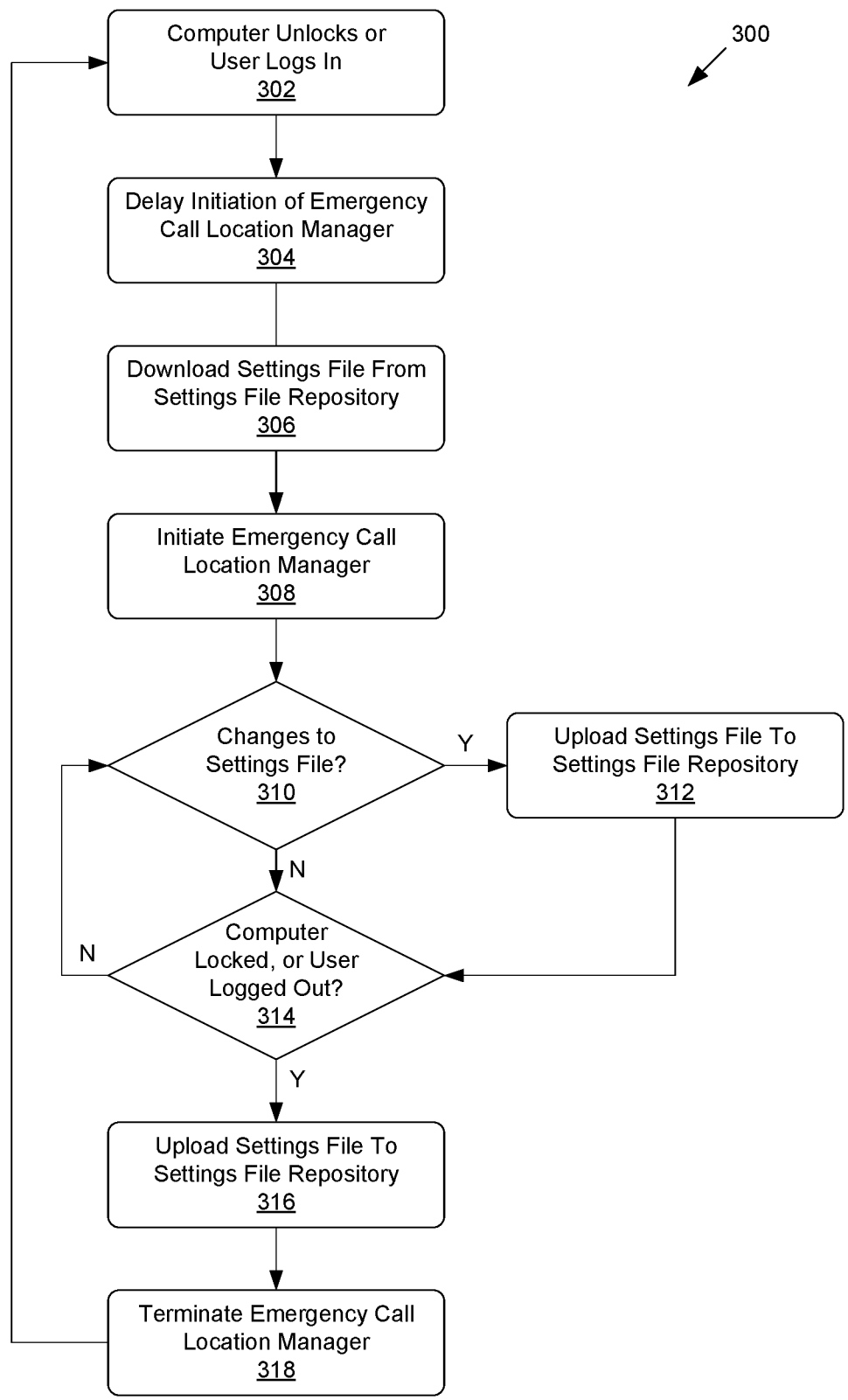
FIG. 3 shows a flowchart illustrating an example method a computer can use to upload and/or download the settings file associated with the emergency call location manager.

FIG. 3 shows a flowchart illustrating an example method 300 a computer can use to upload and/or download the settings file 108 associated with the emergency call location manager 106. The method 300 shown in FIG. 3 can be performed by a computer that is configured to execute instances of the softphone application and the emergency call location manager 106, such as computer 104A or computer 104B. An example system architecture for such a computer is described below with respect to FIG. 4.

As discussed above, the emergency call location manager 106 on the computer can be configured to use the settings file 108, stored locally on the computer, to determine dispatchable location information for emergency calls made via the softphone application 102 on the computer. For example, based on a network address associated with the computer when the computer makes an emergency call via the softphone application 102, the emergency call location manager 106 can determine which of the physical addresses 112 in the locally-stored settings file 108 corresponds the network address, and can use that physical address as dispatchable location information for the emergency call. The method 300 shown in FIG. 3 can be used to delay initiation of the emergency call location manager 106 on the computer until after a most recent version of the settings file 108, in some cases including changes to the settings file 108 made via different computer, have been downloaded to the computer. Accordingly, the method 300 shown in FIG. 3 can avoid registration errors and other issues that may otherwise occur if the settings file 108 is missing or out of date on the computer when the emergency call location manager 106 begins executing on the computer.

At block 302, the computer can be unlocked, or a user can log in to the computer. As an example, the computer may have been powered off, but be powered on and boot up such that a user can provide a password or other user credentials to log in to a user account on the computer. As another example, a user may have previously logged off the computer while the computer remained powered on, and the user or a different user can similarly provide a password or other user credentials to log in to a user account on the computer. As yet another example, a user account may have been locked on the computer, for instance after a period of inactivity, and a user can provide a password or other user credentials to unlock the computer.

At block 302, when the computer is unlocked or a user logs in to the computer, the emergency call location manager may not yet be executing on the computer. For example, the emergency call location manager may not yet have been loaded on the computer if the computer is being freshly booted, or the emergency call location manager may have previously been terminated due to execution of the lock task 208, due to execution of a different task, due to a user logging out of a user account, or due to any other reason.

At block 304, in response to the user unlocking or logging in to the computer, the computer can delay initiation emergency call location manager 106. For instance, the task scheduler 118 on the computer can execute a task to delay initiation of the emergency call location manager 106 on the computer. As an example, if the user unlocked the computer at block 302, the task scheduler 118 can execute the unlock task 212 to delay initiation of the emergency call location manager 106. As another example, if the user logged in to the computer at block 302, the task scheduler 118 can execute the login task 210 to delay initiation of the emergency call location manager 106. In some examples, if a user logged in to the computer, the computer may delay execution of the emergency call location manager 106 in association with the login task 210 for a longer period of time than if the user unlocked the computer and the unlock task 212 delays execution of the emergency call location manager 106.

At block 306, the computer can download the settings file 108 from the settings file repository 122. For instance, a task executed by the task scheduler 118, such as the login task 210 or the unlock task 212, can cause the computer to download the settings file 108 from the settings file repository 122, and to store the downloaded settings file 108 in a data storage location on the computer where the emergency call location manager 106 is configured to locally access the settings file 108. In some examples, the data storage location to which the settings file 108 is downloaded can be a directory, folder, or other file location associated with user data for the user account of the user. The task may be configured to locate the settings file 108 in the settings file repository 122 based on an identifier of a user account of the user, a softphone number of the user, or another identifier of the user.

At block 308, after the computer has downloaded the settings file 108 at block 306, the computer can initiate the emergency call location manager 106. As discussed above, initiation of the emergency call location manager 106 can have been delayed at block 304, so that the settings file 108 can be downloaded to the computer at block 306 before the computer begins executing the emergency call location manager 106 at block 308.

At block 310, the computer can determine whether any changes have been made to the settings file 108 locally by the emergency call location manager 106. For example, the task scheduler 118 can periodically execute the repeating upload task 206 to determine whether the settings file 108 stored locally on the computer has been changed since the last time the repeating upload task 206 was executed, and/or relative to a copy of the settings file 108 stored in the settings file repository 122. If the computer determines that changes have been made locally to the settings file 108 (Block 310—Yes), the computer can upload the settings file 108 to the settings file repository 122 at block 312, for instance using the repeating upload task 206.

After uploading the changed settings file 108 to the settings file repository 122 at block 312, or if the computer determines that no changes have been made locally to the settings file 108 (Block 310-No), the computer can determine whether the computer has been locked or a user has been logged out of the computer at block 314. In some examples, if the computer is being shut down, shutdown operations can include logging out the user at block 314. If the computer has not been locked and a user has not been logged out (Block 314-No), the computer can return to block 310 to determine whether any changes have been made to the settings file 108 locally by the emergency call location manager 106.

However, if the computer has been locked or a user has been logged out (Block 314—Yes), the computer can upload the settings file 108 to the settings file repository 122 at block 316, and can terminate the emergency call location manager 106 at block 318. For example, if the computer is being locked, the task scheduler 118 on the computer can execute the lock task 208 to upload the settings file 108 and terminate the emergency call location manager 106 on the computer, even if other applications remain active while the computer is locked. As another example, if a user has logged out of a user account, the task scheduler 118 may execute the lock task 208 or another task to upload the settings file 108, and the task, an operating system, or another element may terminate the emergency call location manager 106, in some cases along with other applications that had been executing on the computer.

As shown in FIG. 3, after uploading the settings file 108 to the settings file repository 122 at block 316, and terminating the emergency call location manager 106 at block 318, the computer can return to block 302. Accordingly, the next time the user or a different user unlocks or logs in to the computer, the computer can delay re-initiation of the terminated emergency call location manager 106 on the computer at block 304 until after the computer downloads the most recent version of the settings file 108 at block 306.

Overall, by delaying the initiation of the emergency call location manager 106 until after the most recent version of the settings file 108 has been downloaded from the settings file repository 122 at block 306, the emergency call location manager 106 can access the downloaded copy of the settings file 108 when the emergency call location manager 106 begins executing. The emergency call location manager 106 can thus avoid any registration errors or other errors that might otherwise have occurred natively if the settings file 108 was not present on the computer when the emergency call location manager 106 began executing, or if the locally-stored settings file 108 was out of date when the emergency call location manager 106 began executing.

For example, if a user had previously used computer 104A to register a softphone number with instances of the softphone application 102 and the emergency call location manager 106, the settings file 108 associated with the softphone number may have been created on computer 104A. However, the computer 104A may have used method 300 to upload the settings file 108 to the settings file repository 122 at block 312 or block 316. Accordingly, when the user switches to using computer 104B, computer 104B can use method 300 to download the settings file 108 originally created on computer 104A from the settings file repository 122 at block 306 before the emergency call location manager 106 begins executing on computer 104B at block 308. When the emergency call location manager 106 begins executing on computer 104B at block 308, the emergency call location manager 106 can access the settings file 108 that was downloaded to computer 104B at block 306. Registration errors associated with the emergency call location manager 106, which might otherwise have occurred if the settings file 108 was missing on computer 104B upon initiation of the emergency call location manager 106 on computer 104B and the emergency call location manager 106 checked with the registration data repository 116 to determine whether the softphone number is already associated with a settings file, can therefore be avoided.

As another example, if an instance of the emergency call location manager 106 on computer 104A makes changes to the settings file 108, for instance to add a pairing of a detected network address and a physical address entered by a user, computer 104A can upload the updated settings file 108 to the settings file repository 122 at block 312 or block 316 of method 300. If a user later switches from using computer 104A to using computer 104B, computer 104B can use method 300 to download the updated settings file 108 from the settings file repository 122 at block 306. If the emergency call location manager 106 then begins executing on computer 104B at block 308, and determines that computer 104B has a network connection associated with the same network address that was added to the settings file 108 earlier by computer 104A, the emergency call location manager 106 on computer 104B can determine from the downloaded settings file 108 that a physical address associated with that network address is already stored within the settings file 108, and the emergency call location manager 106 can avoid prompting the user to again enter the physical address associated with that network address.

Figure 4:
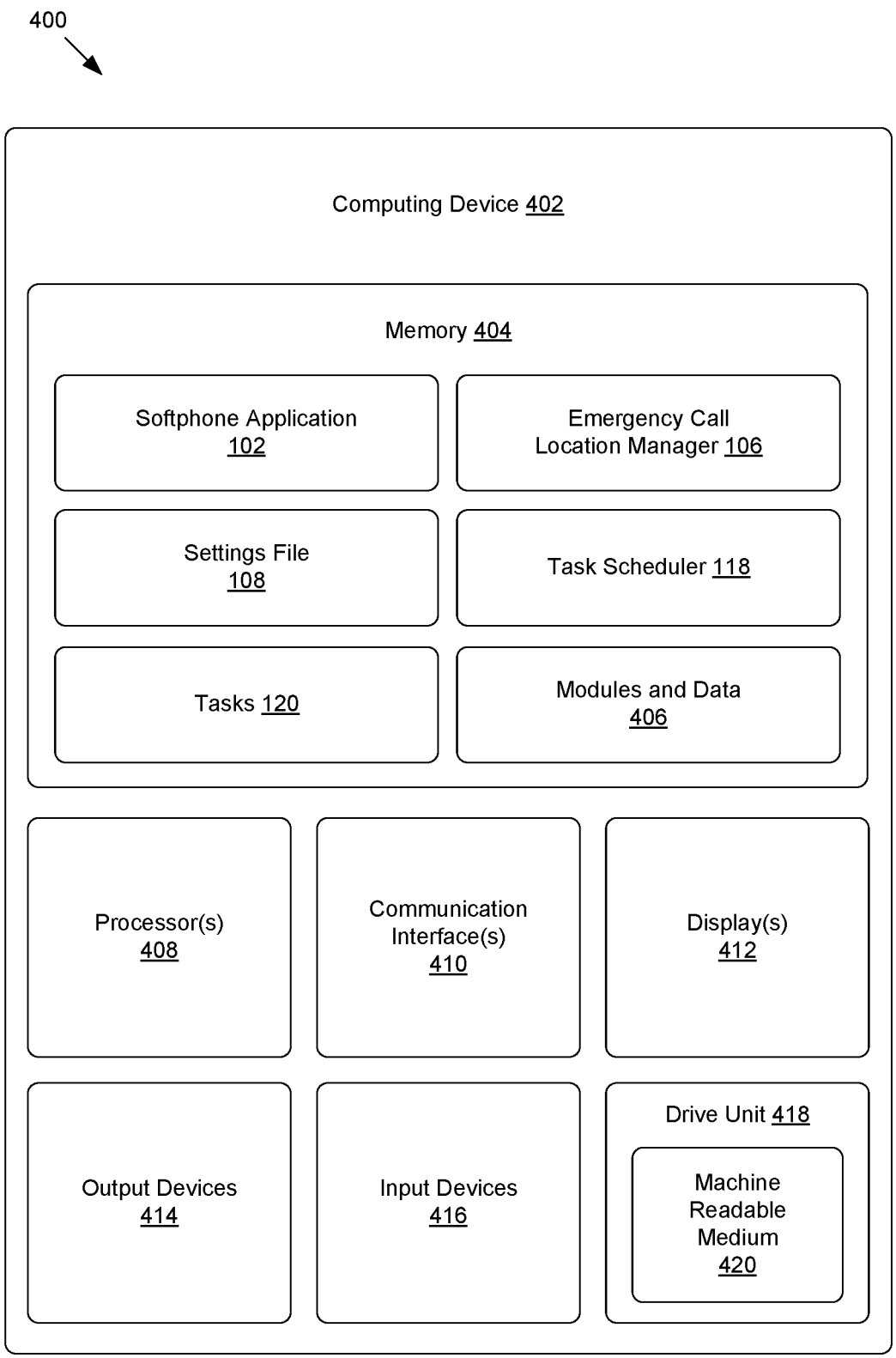
FIG. 4 shows an example system architecture for a computing device that can execute instances of the softphone application, the emergency call location manager, and the task scheduler.

FIG. 4 shows an example system architecture 400 for a computing device 402 that can execute instances of the softphone application 102, the emergency call location manager 106, and the task scheduler 118 described herein. The computing device 402 can be a computer, workstation, computing system, or other type of computing device, such as one of the computers 104 shown in FIG. 1. For example, each of the computers 104 shown in FIG. 1 can be an instance of the computing device 402 shown in FIG. 4. The computing device 402 shown in FIG. 4 can also be an example of a computer that executes the example method 300 discussed above with respect to FIG. 3. In some examples, the settings file repository 122, the registration data repository 116, and/or other elements described herein can be executed by servers or other computing elements that may have system architectures similar to the system architecture shown in FIG. 4.

The computing device 402 can include memory 404. In various examples, the memory 404 can include system memory, which may be volatile (such as RAM), non-volatile (such as ROM, flash memory, etc.) or some combination of the two. The memory 404 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 402. Any such non-transitory computer-readable media may be part of the computing device 402.

The memory 404 can store one or more software or firmware elements, such as data and/or computer-readable instructions that are executable by one or more processors 408. For example, the memory 404 can store computer-executable instructions and data associated with the softphone application, the emergency call location manager 106, the settings file 108 used by the emergency call location manager 106, the task scheduler 118, tasks 120 executed by the task scheduler 118, and/or other modules and data 406. The modules and data 406 can include any other modules and/or data that can be utilized by the computing device 402 to perform or enable performing any action taken by the computing device 402. Such other modules and data can include a platform, operating system, and applications, and data utilized by the platform, operating system, and applications.

The computing device 402 can also have processor(s) 408, communication interfaces 410, a display 412, output devices 414, input devices 416, and/or a drive unit 418 including a machine readable medium 420.

In various examples, the processor(s) 408 can be a central processing unit (CPU), a graphics processing unit (GPU), both a CPU and a GPU, or any other type of processing unit. Each of the one or more processor(s) 408 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 408 may also be responsible for executing computer applications stored in the memory 404, which can be associated with common types of volatile (RAM) and/or nonvolatile (ROM) memory.

The communication interfaces 410 can include transceivers, modems, interfaces, antennas, telephone connections, and/or other components that can transmit and/or receive data over networks, telephone lines, or other connections. In some examples, the communication interfaces 410 can be used by the softphone application 102 and/or the emergency call location manager 106 to make calls via the Internet and/or other networks. In other examples, the communication interfaces 410 can be used in association with tasks 120 to upload or download the settings file 108 as described herein.

The display 412 can be a liquid crystal display, or any other type of display commonly used in computing devices. For example, a display 412 may be a touch-sensitive display screen, and can then also act as an input device or keypad, such as for providing a soft-key keyboard, navigation buttons, or any other type of input.

The output devices 414 can include any sort of output devices known in the art, such as the display 412, speakers, a vibrating mechanism, and/or a tactile feedback mechanism. Output devices 414 can also include ports for one or more peripheral devices, such as headphones, peripheral speakers, and/or a peripheral display.

The input devices 416 can include any sort of input devices known in the art. For example, input devices 416 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 420 can store one or more sets of instructions, such as software or firmware, that embodies any one or more of the methodologies or functions described herein. The instructions can also reside, completely or at least partially, within the memory 404, processor(s) 408, and/or communication interface(s) 410 during execution thereof by the computing device 402. The memory 404 and the processor(s) 408 also can constitute machine readable media 420.

Overall, the tasks 120 executed by instances of the task scheduler 118 on one or more computers 104 can cause changes to the settings file 108 associated with a softphone number of a user, made locally by one or more instances of the emergency call location manager 106 on the one or more computers 104, to be reflected in a copy of the settings file 108 stored remotely at the settings file repository 122. The tasks 120 executed by the instances of the task scheduler 118 can also cause the most recent version of the settings file 108 to be downloaded to the corresponding computers 104 from the settings file repository 122 before instances of the emergency call location manager 106 begin executing on the computers 104, for instance when the computers 104 are unlocked or when the user logs into the computers. Accordingly, the instances of the emergency call location manager 106 can have access to a local copy of the most up-to-date version of the settings file 108 when the instances of the emergency call location manager 106 begin executing, which can avoid registration errors and other issues that might otherwise occur if the settings file 108 was missing or out-of-date when the instances of the emergency call location manager 106 begin executing.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
   delaying, by a processor of a computing device, and based on a task performed by a task scheduler executing on the computing device, initiation of execution of an emergency call location manager on the computing device for a period of time, wherein:
   the task scheduler is configured to perform the task in response to a trigger event, and
   the emergency call location manager is configured to determine, based on a settings file stored locally in memory of the computing device, dispatchable location information for emergency calls made via a softphone application executing on the computing device;
   causing, by the processor, and based on the task performed by the task scheduler, a download of the settings file from a remote settings file repository to the memory of the computing device during the period of time; and
   initiating, by the processor, and after the period of time based on the task performed by the task scheduler, the execution of the emergency call location manager on the computing device.

2. The computer-implemented method of claim 1, wherein the settings file stores one or more pairings of network addresses and physical addresses, and the emergency call location manager is configured to determine the dispatchable location information by:
   identifying a network address associated with a network connection of the computing device when an emergency call is made via the softphone application; and
   determining a physical location that the settings file indicates is associated with the network address.

3. The computer-implemented method of claim 1, wherein the task is one of:
   a login task that the task scheduler is configured to perform in response to a first trigger event associated with a user logging in to the computing device, or
   an unlock task that the task scheduler is configured to perform in response to a second trigger event associated with the user unlocking the computing device.

4. The computer-implemented method of claim 3, wherein the period of time is:
   a first period of time associated with the login task, or
   a second period of time, longer than the first period of time, associated with the unlock task.

5. The computer-implemented method of claim 1, further comprising causing, by the processor, and based on a second task performed by the task scheduler, an upload of the settings file from the computing device to the remote settings file repository.

6. The computer-implemented method of claim 5, wherein the second task is a repeating upload task that the task scheduler is configured to perform periodically based on:
   a user being logged in to the computing device; and
   a change having been made to the settings file by the emergency call location manager.

7. The computer-implemented method of claim 5, wherein the second task is a lock task that the task scheduler is configured to perform in response to the computing device being locked.

8. The computer-implemented method of claim 7, wherein the lock task further causes the processor to terminate the execution of the emergency call location manager on the computing device.

9. A computing device, comprising:
   one or more processors, and memory storing computer-executable instructions that, when executed by the one or more processors, cause the one or more processors to execute a task scheduler configured to automatically perform tasks on the computing device, wherein a task performed by the task scheduler in response to a trigger event causes:
   a delay in an initiation of execution of an emergency call location manager on the computing device for a period of time, the emergency call location manager being configured to determine, based on a settings file stored locally in the memory, dispatchable location information for emergency calls made via a softphone application executing on the computing device;
   a download of the settings file from a remote settings file repository to the memory during the period of time; and
   the initiation of the execution of the emergency call location manager, after the period of time, on the computing device.

10. The computing device of claim 9, wherein the task is one of:
    a login task that the task scheduler is configured to perform in response to a first trigger event associated with a user logging in to the computing device, or
    an unlock task that the task scheduler is configured to perform in response to a second trigger event associated with the user unlocking the computing device.

11. The computing device of claim 9, wherein a second task performed by the task scheduler causes an upload of the settings file from the computing device to the remote settings file repository.

12. The computing device of claim 11, wherein the second task is a repeating upload task that the task scheduler is configured to perform periodically based on:
    a user being logged in to the computing device; and
    a change having been made to the settings file by the emergency call location manager.

13. The computing device of claim 11, wherein the second task is a lock task that:
    the task scheduler is configured to perform in response to the computing device being locked, and
    causes termination of the execution of the emergency call location manager on the computing device.

14. One or more non-transitory computer-readable media storing computer-executable instructions that, when executed by one or more processors of a computing device, cause the computing device to:
    execute a task scheduler configured to automatically perform tasks based on corresponding trigger events that occur on the computing device;
    delay, based on a task performed by the task scheduler in response to a trigger event, initiation of execution of an emergency call location manager on the computing device for a period of time, wherein:
    the emergency call location manager is configured to determine, based on a settings file stored locally in memory of the computing device, dispatchable location information for emergency calls made via a softphone application executing on the computing device;
    cause, based on the task performed by the task scheduler, a download of the settings file from a remote settings file repository to the memory of the computing device during the period of time; and initiate, after the period of time, and based on the task performed by the task scheduler, the execution of the emergency call location manager on the computing device.

15. The one or more non-transitory computer-readable media of claim 14, wherein the task is one of:
   a login task associated with a first trigger event of a user logging in to the computing device, or
   an unlock task associated with a second trigger event of the user unlocking the computing device.

16. The one or more non-transitory computer-readable media of claim 14, wherein the computer-executable instructions further cause the computing device to, based on a second task performed by the task scheduler in response to a second trigger event, an upload of the settings file from the computing device to the remote settings file repository.

17. The one or more non-transitory computer-readable media of claim 16, wherein:
   the second task is a repeating upload task, the second trigger event is based on a periodic schedule while a user is logged in to the computing device, and
   the upload is performed in response to a change having been made to the settings file by the emergency call location manager.

18. The one or more non-transitory computer-readable media of claim 16, wherein the second task is a lock task and the second trigger event is the computing device being locked.

19. The one or more non-transitory computer-readable media of claim 18, wherein the lock task further causes termination of the execution of the emergency call location manager on the computing device.

20. A computing device comprising:
   means for delaying an initiation of execution of an emergency call location manager on the computing device for a period of time, wherein:
      the emergency call location manager is configured to determine, based on a settings file stored locally in memory of the computing device, dispatchable location information for emergency calls made via a softphone application executing on the computing device;
   means for downloading the settings file from a remote settings file repository to the memory of the computing device during the period of time; and
   means for initiating, after the period of time, the execution of the emergency call location manager on the computing device.

* * * * *